US009146950B1

(12) United States Patent
Cooley

(10) Patent No.: US 9,146,950 B1
(45) Date of Patent: Sep. 29, 2015

(54) SYSTEMS AND METHODS FOR DETERMINING FILE IDENTITIES

(71) Applicant: Symantec Corporation, Mountain View, CA (US)

(72) Inventor: Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 210 days.

(21) Appl. No.: 13/714,426

(22) Filed: Dec. 14, 2012

(51) Int. Cl.
*G06F 17/30* (2006.01)

(52) U.S. Cl.
CPC .................................. *G06F 17/3033* (2013.01)

(58) Field of Classification Search
CPC .................................................. G06F 17/3033
USPC ................. 707/698, 759, 769; 726/22, 23, 24
See application file for complete search history.

(56) References Cited

U.S. PATENT DOCUMENTS

| 7,539,871 | B1 | 5/2009 | Osborn | |
|---|---|---|---|---|
| 8,302,193 | B1 * | 10/2012 | Gardner et al. | 726/24 |
| 2008/0243879 | A1 * | 10/2008 | Gokhale et al. | 707/100 |
| 2011/0138465 | A1 | 6/2011 | Franklin et al. | |

OTHER PUBLICATIONS

Xiaozhu Kang et al., Measurement, Modeling, and Analysis of Internet Video Sharing Site Workload: A Case Study, 2008, IEEE, 278-285.*
Forum.xbmc; Identify Files by Checksum; a. http://forum.xbmc.org/showthread.php?tid=101026; as accessed on Oct. 10, 2012.
API The Moviedb; DVD ID's and File Hashing; b. http://api.themoviedb.org/2.1/ids-hashes; as accessed on Oct. 10, 2012.
Carey Nachenberg; Systems and Methods for Detecting Malicious Files; U.S. Appl. No. 13/715,265, filed Dec. 14, 2012.
"Microsoft", http://windows.microsoft.com/en-us/windows/security-essentials-download, as accessed Oct. 10, 2012, (On or before Oct. 10, 2012).

* cited by examiner

*Primary Examiner* — Jean B Fleurantin
(74) *Attorney, Agent, or Firm* — ALG Intellectual Property, LLC

(57) ABSTRACT

A computer-implemented method for determining file identities may include identifying a file stream that is subject to an assessment, generating a hash based at least in part on a portion of the file stream between a start and an offset of the file stream, querying the database to determine whether the hash matches at least one file in the database, receiving a response that indicates that the file stream matches a plurality of files in the database and that requests an additional hash of the file stream that is based at least in part on an additional portion of the file stream ending between the offset and a subsequent offset of the file stream, generating the additional hash of the file stream, querying the database with the additional hash, and receiving an additional response including a characterization of the file. Various other methods, systems, and computer-readable media are also disclosed.

20 Claims, 8 Drawing Sheets

SYSTEMS AND METHODS FOR DETERMINING FILE IDENTITIES

BACKGROUND

People increasingly rely on the Internet for business and personal use. As individuals and organizations provide more services via the Internet, there arise more opportunities for malicious parties to exploit these services to illegitimate ends. For example, malicious parties may propagate malware and other unwanted and/or illegitimate data via file transfers.

Some traditional security systems may observe the entirety of a file before making a determination. Unfortunately, retrieving and processing the entire file may be resource intensive, potentially consuming significant amounts of network bandwidth, memory, and/or other computing resources. Additionally, retrieving an entire file before making a malware determination may increase the latency of some operations that depend on a malware determination of the file. Some traditional systems may attempt to analyze a file based on a partial hash of the file. Unfortunately, some files may share significant amounts of data with other files, making positive determinations about files using partial hashes more difficult. Accordingly, the instant disclosure identifies and addresses a need for additional and improved systems and methods for determining file identities.

SUMMARY

As will be described in greater detail below, the instant disclosure generally relates to systems and methods for determining file identities by using partial hashes including data up to specified offsets of the file stream to make a determination about the file before the file stream has completed. In some examples, these systems and methods may receive feedback from file databases specifying offsets at which the file streams may be uniquely identified among files within the file databases.

In one example, a computer-implemented method for determining file identities may include (1) identifying a file stream that is subject to a determination of whether the file stream matches at least one file in a database, (2) generating a hash based at least in part on a portion of the file stream between a start of the file stream and an offset of the file stream but not based on any part of the file stream following the offset, (3) querying the database with the hash to determine whether the hash matches at least one file in the database, (4) receiving a response from the database that indicates that the file stream matches a plurality of files in the database and that requests an additional hash of the file stream that is based at least in part on an additional portion of the file stream ending between the offset and a subsequent offset of the file stream but that is not based on any part of the file stream following the subsequent offset, (5) generating the additional hash of the file stream based at least in part on the additional portion of the file stream, (6) querying the database with the additional hash to determine whether the additional hash matches at least one file in the database, and (7) receiving an additional response from the database including a characterization of the file stream.

In some examples, the characterization of the file stream may include an indication the file stream is malicious. In these examples, the computer-implemented method may include terminating the file stream.

In some examples, the characterization of the file stream may include an indication the file stream is not malicious. In these examples, the computer-implemented method may include offloading the file stream to a hardware accelerator.

Determining a characterization of the file stream may, in some examples, further include determining a unique identity of a file within the file stream.

In some examples, determining an identity of a file stream may further include (1) identifying a second file stream that is subject to a second determination of whether the second file stream matches at least one file in the database, (2) generating a second hash based at least in part on a second portion of the second file stream between a second start of the second file stream and a second offset of the second file stream but not based on any part of the second file stream following the second offset, (3) querying the database with the second hash to determine whether the second hash matches at least one file in the database, and (4) receiving a second response from the database indicating that the second hash does not match any file in the database. In these examples, the computer-implemented method may include terminating the file stream before it is complete in response to the characterization of the file stream.

In some examples, generating the hash may be further based on (1) a position of the portion in the file stream and/or (2) the total expected size of the file stream.

In some examples, generating the initial hash may take place before the offset specified for the additional hash has been reached.

In one example, a computer-implemented method for determining file identities may include (1) receiving, from a computing system, a partial hash based on an offset of the file stream, (2) checking the hash against a database and determining that the hash does not meet a predetermined threshold for uniqueness, (3) determining that a subsequent offset will meet the predetermined threshold, (4) requesting, from the computing system, an additional hash of the file stream based on the subsequent offset, (5) receiving a response from the computing system that includes the additional hash and checking the additional hash against the database for at least one matching file (6) determining, based on checking the additional hash against the database, a characteristic of the file, and (7) sending the characteristic of the file to the computing system.

In some examples, determining that the subsequent offset will meet the predetermined threshold includes checking the hash against the database and determining that the hash matches a plurality of files in the database and determining the subsequent offset at which the additional hash will exclude all files within the plurality of files except a unique known file within the plurality of files.

In some examples, determining that the subsequent offset will meet the predetermined threshold may include checking the hash against the database and determining that the hash matches a plurality of files in the database and determining the subsequent offset at which the additional hash will exclude all files within the plurality of files that do not share the characteristic and will match a subset of the plurality of files that do share the characteristic.

In some examples, determining the file identity may further include (1) receiving, from the computing system, a second hash that is based at least in part on a second portion of a second file stream between a start of the second file stream and a second offset of the second file stream but that is not based on any part of the second file stream following the second offset, (2) checking the second hash against the database and determining that the second hash does not match any files in the database, and (3) sending a second response to the computing system indicating that the second file stream is unrecognized.

In some examples, the computing system may include a gateway configured to filter network traffic for a client system and the file stream may travel to the client system via the gateway.

In some examples, identifying the file may further include (1) receiving a prior hash from the computing system based at least in part on the file stream, (2) checking the prior hash against the database and determining that the prior hash does not meet the predetermined threshold for uniqueness, (3) determining that the offset will meet the predetermined threshold, and (4) requesting, from the computing system, the hash of the file stream that is based at least in part on the portion of the file stream between the start of the file stream and the offset of the file stream but not based on any part of the file stream following the offset.

In one embodiment, a system for implementing the above-described method may include (1) an identification module programmed to identify a file stream that is subject to a determination of whether the file stream matches at least one file in a database, (2) a generation module programmed to generate a hash based at least in part on a portion of the file stream between a start of the file stream and an offset of the file stream but not based on any part of the file stream following the offset, (3) a querying module programmed to query the database with the hash to determine whether the hash matches at least one file in the database, (4) a receiving module programmed to receive a response from the database that indicates that the file stream matches a plurality of files in the database and that requests an additional hash of the file stream that is based at least in part on an additional portion of the file stream ending between the offset and a subsequent offset of the file stream but that is not based on any part of the file stream following the subsequent offset. The system may also include at least one processor configured to execute the identification module, the generation module, the querying module, and the receiving module. In this embodiment, the generation module may be further programmed to generate the additional hash of the file stream based at least in part on the additional portion of the file stream, the querying module may be further programmed to query the database with the additional hash to determine whether the additional hash matches at least one file in the database, and the receiving module may be further programmed to receive an additional response from the database including a characterization of the file stream.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
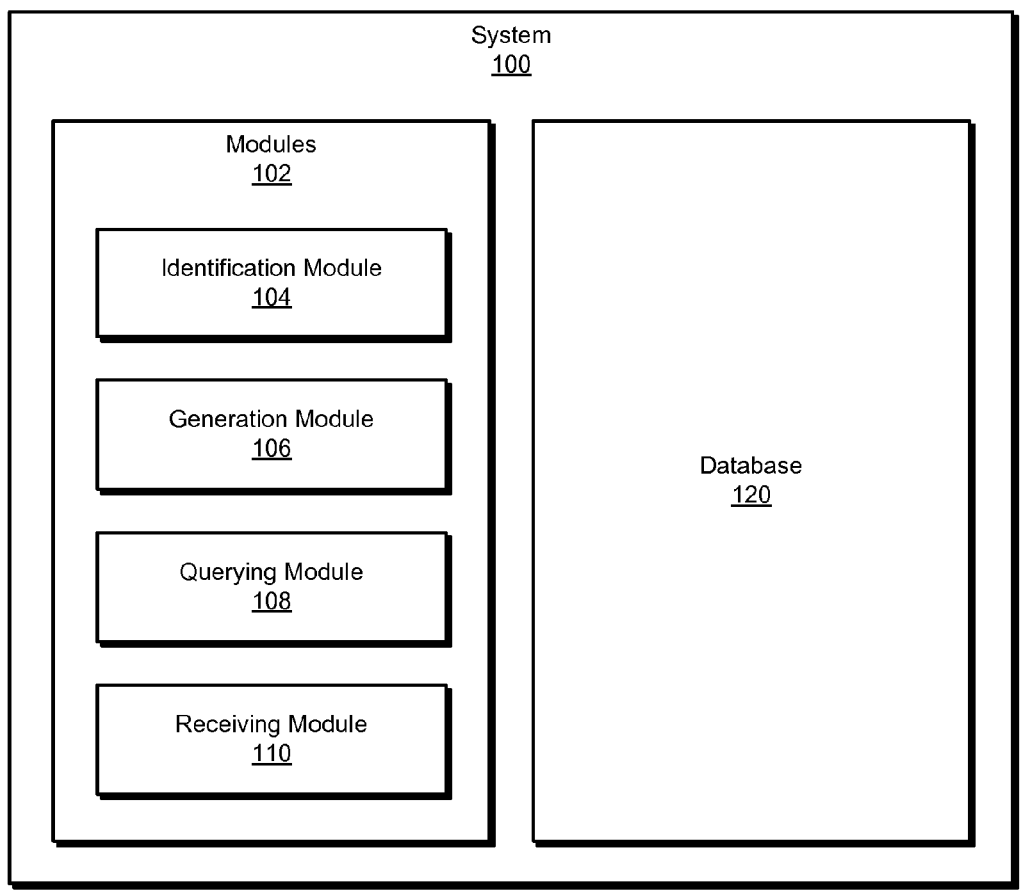
FIG. 1 is a block diagram of an exemplary system for determining file identities.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for determining file identities. As will be explained in greater detail below, by using partial hashes including data up to specified offsets of the file stream to make a determination about the file before the file stream has completed, the systems and methods described herein may identify a file before the completion of the file stream, thereby potentially reducing the resources used for identifying the file. Additionally, in some examples, by receiving feedback from file databases specifying offsets at which the file streams may be uniquely identified among files within the file databases, these systems and methods may identify files more quickly and/or efficiently by determining how much of a file stream requires analysis before a file database can uniquely identify the file.

Figure 2:
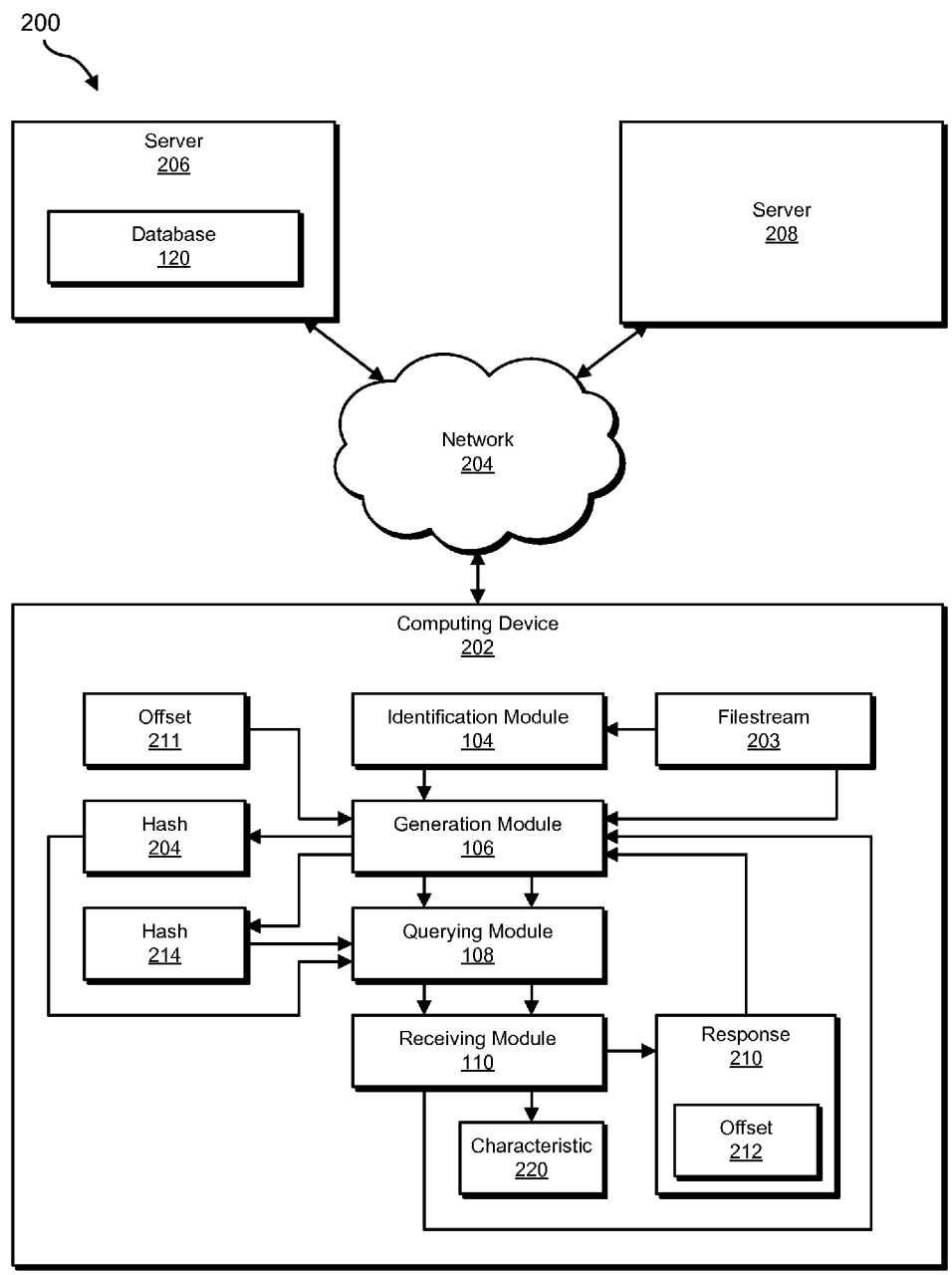
FIG. 2 is a block diagram of an exemplary system for determining file identities.
Figure 3:
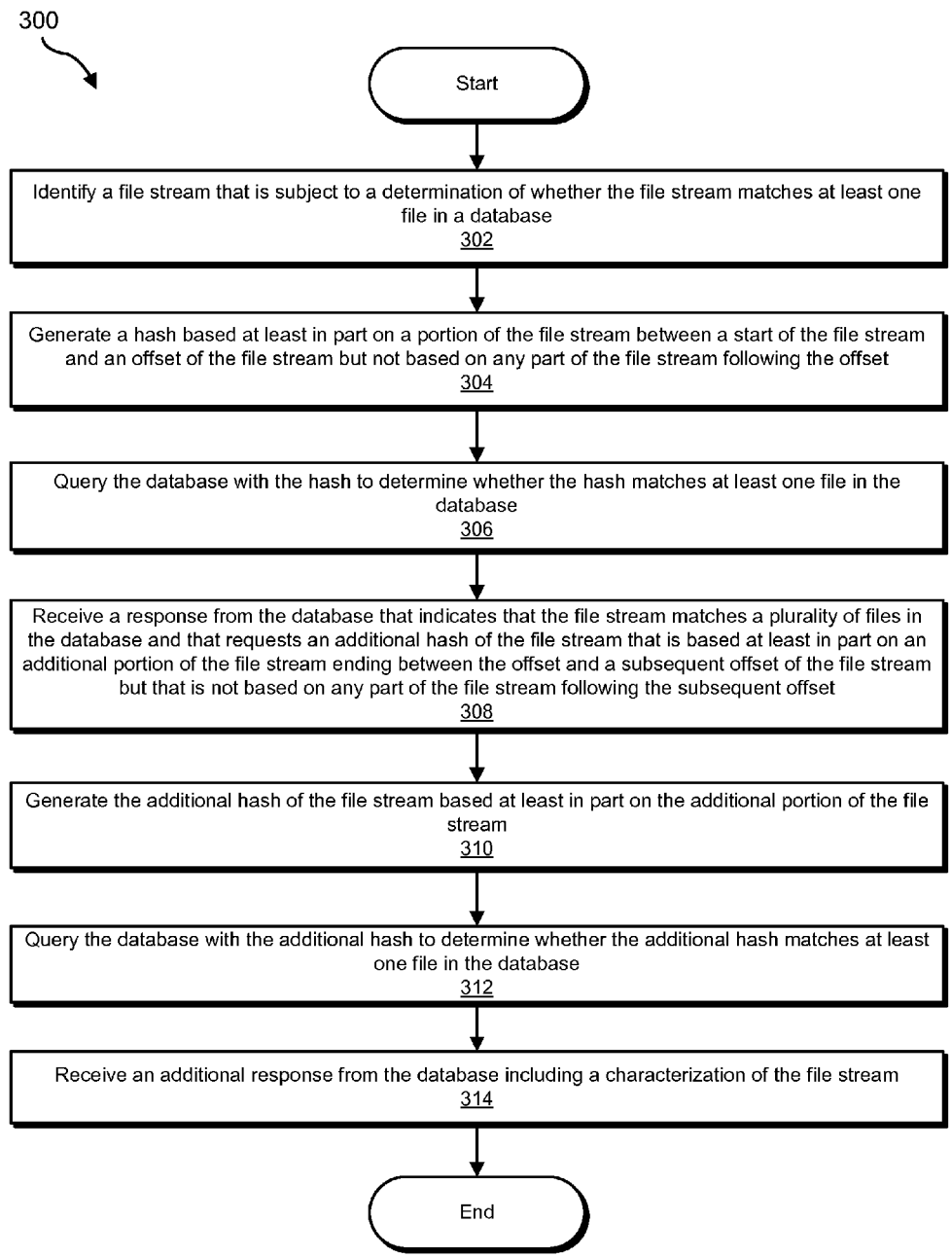
FIG. 3 is a flow diagram of an exemplary method for determining file identities.
Figure 4:
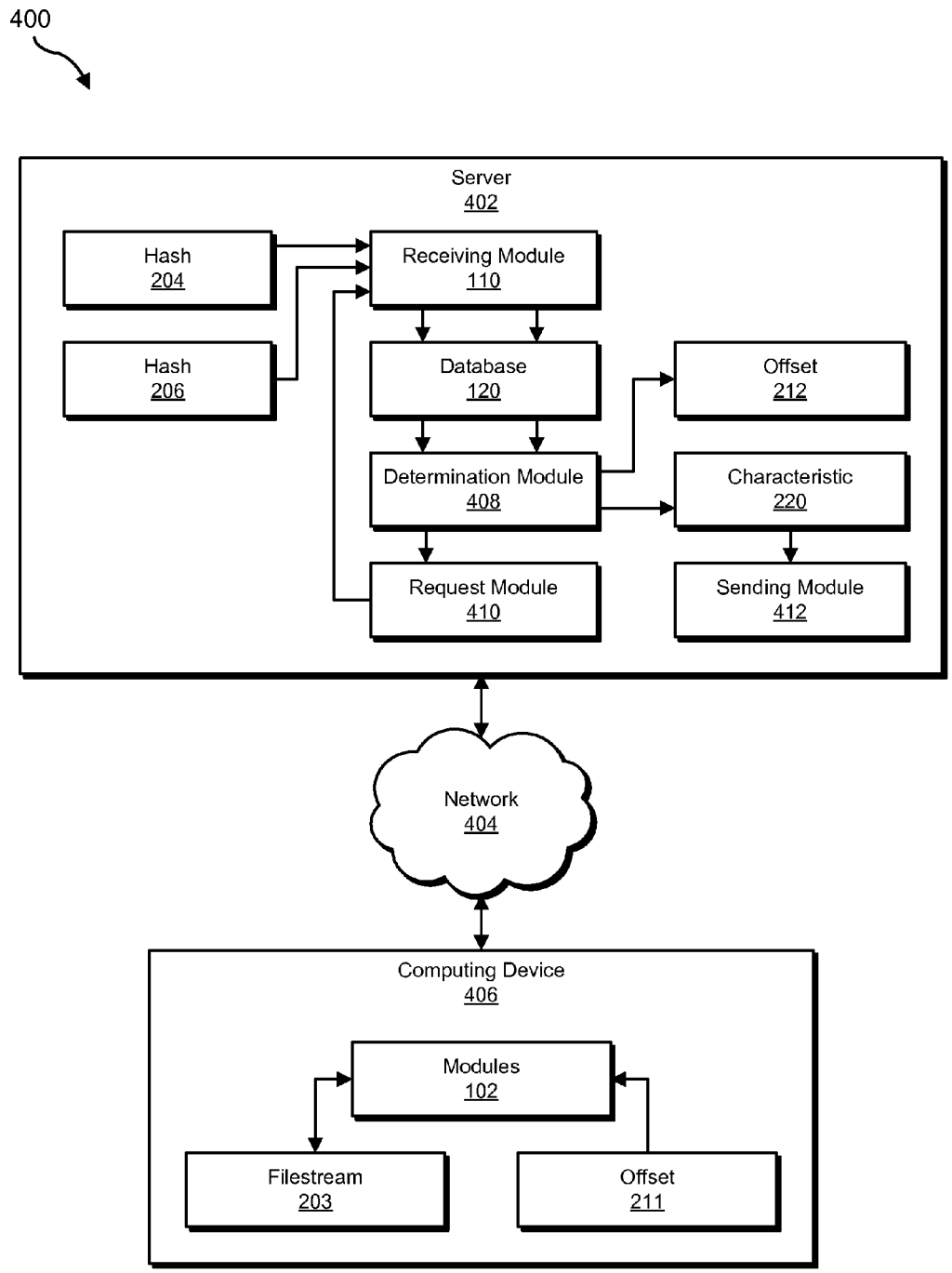
FIG. 4 is a block diagram of an exemplary system for determining file identities.

The following will provide, with reference to FIGS. 1, 2, and 4, detailed descriptions of exemplary systems for determining file identities. Detailed descriptions of corresponding computer-implemented methods will also be provided in connection with FIGS. 3 and 5. Detailed descriptions of an exemplary file stream will be provided in connection with FIG. 6. In addition, detailed descriptions of an exemplary computing system and network architecture capable of implementing one or more of the embodiments described herein will be provided in connection with FIGS. 7 and 8, respectively.

FIG. 1 is a block diagram of exemplary system 100 for determining file identities. As illustrated in this figure, exemplary system 100 may include one or more modules 102 for performing one or more tasks. For example, and as will be explained in greater detail below, exemplary system 100 may include an identification module 104 programmed to identify a file stream that is subject to a determination of whether the file stream matches at least one file in a database. Exemplary system 100 may also include a generation module 106 programmed to generate a hash based at least in part on a portion of the file stream between a start of the file stream and an offset of the file stream but not based on any part of the file stream following the offset. Exemplary system 100 may additionally include a querying module 108 programmed to query a database, such as database 120, with the hash to determine whether the hash matches at least one file in database 120. Exemplary system 100 may additionally include a receiving module 110 programmed to receive a response from database 120 that indicates that the file stream matches a plurality of files in database 120 and that requests an additional hash of the file stream that is based at least in part on an additional portion of the file stream ending between the offset and a subsequent offset of the file stream but that is not based on any part of the file stream following the subsequent offset. Generation module 106 may also be programmed to generate the additional hash of the file stream based at least in part on the additional portion of the file stream. Querying module 108 may also be programmed to query database 120 with the additional hash to determine whether the additional hash matches at least one file in database 120. Receiving module 110 may also be programmed to receive an additional response from database 120 including a characterization of the file stream. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store information about file streams. In some examples, database 120 may store one or more malicious files and/or hashes of malicious files.

Database 120 may represent portions of a single database or computing device or a plurality of databases or computing devices. For example, database 120 may represent a portion of server 206 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as server 206 in FIG. 2, computing system 710 in FIG. 7, and/or portions of exemplary network architecture 800 in FIG. 8.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 and a server 208 via a network 204. In some examples, computing device 202 may receive a file stream 203 from server 208. Computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, facilitate computing device 202 and/or server 206 in determining file identities. For example, and as will be described in greater detail below, identification module 104 may be programmed to identify file stream 203 that is subject to a determination of whether file stream 203 matches at least one file in database 120. Generation module 106 may be programmed to generate hash 204 based at least in part on a portion of file stream 203 between a start of file stream 203 and offset 211 of file stream 203 but not based on any part of file stream 203 following offset 211. Querying module 108 may be programmed to query database 120 with hash 204 to determine whether hash 204 matches at least one file in database 120. Receiving module 110 may be programmed to receive response 210 from database 120 that indicates that file stream 203 matches a plurality of files in database 120 and that requests hash 214 of file stream 203 that is based at least in part on an additional portion of file stream 203 ending between offset 211 and a subsequent offset 212 of file stream 203 but that is not based on any part of file stream 203 following offset 212. Generation module 106 may be further programmed to generate hash 214 of file stream 203 based at least in part on the additional portion of file stream 203. Querying module 108 may be further programmed to query database 120 with hash 214 to determine whether hash 214 matches at least one file in database 120. Receiving module 110 may be further programmed to receive an additional response from database 120 including a characteristic 220 of file stream 203.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 710 in FIG. 7, or any other suitable computing device.

Server 206 generally represents any type or form of computing device that is capable of containing a database. Examples of server 206 include, without limitation, application servers and database servers configured to provide various database services and/or run certain software applications. In some examples, server 206 may include a security server.

Server 208 generally represents any type or form of computing device that is capable of storing, relaying, or transmitting a file. Examples of server 208 include, without limitation, application servers and database servers configured to provide various database services and/or run certain software applications. In some examples, server 208 may include a web server.

Network 204 generally represents any medium or architecture capable of facilitating communication or data transfer. Examples of network 204 include, without limitation, an intranet, a Wide Area Network (WAN), a Local Area Network (LAN), a Storage Area Network (SAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between computing device 202 and server 206 and/or computing device 202 and server 208.

FIG. 3 is a flow diagram of an exemplary computer-implemented method 300 for determining file identities. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may identify a file stream that is subject to a determination of whether the file stream matches at least one file in a database. For example, at step 302 identification module 104 may, as part of computing device 202 in FIG. 2, identify file stream 203 that is subject to a determination of whether file stream 203 matches at least one file in database 120.

As used herein, the phrase "file stream" may refer to any data being transferred by a gateway. In some examples the phrase "file stream" may refer to an executable file (e.g., a malware sample). In some examples, the phrase "file stream" may refer to a media file (e.g., a movie). In some examples, the file stream may represent a file that has been completely downloaded by a gateway. In some examples, the file stream may represent a file that a gateway is in the process of downloading.

Identification module 104 may identify the file stream in any of a variety of contexts. For example, identification module 104 may identify the file stream as a part of a gateway configured to connect a local network to an external network. In this example, identification module 104 may identify the file stream being downloaded from the external network to a client system on the local network (e.g., via the gateway).

In some embodiments, identification module 104 may attempt to identify all file streams passing through an intermediate networking device (e.g., a gateway). Additionally or alternatively, identification module 104 may identify the file stream in response to a security policy relating to the file stream. For example, identification module 104 may be configured to identify file streams directed at any of a specified group of client systems (e.g., client systems that are less trusted, client systems lacking a specified level of on-host security, client systems subject to a minimum security standard, etc.). In some embodiments, identification module 104 may be configured to identify file streams originating from any of a specified group of locations (e.g., untrusted servers).

FIG. 4 illustrates an exemplary system 400 for determining file identities. As illustrated in FIG. 4, exemplary system 400 may include a server 402 in communication with a computing device 406 via a network 404. For example, computing device 406 may communicate with server 402 to determine the identity of file stream 203. In some examples, computing device 406 may be configured with modules 102, including identification module 104. In some embodiments, server 402 may include receiving module 110, database 120, a determination module 408, a request module 410, and/or a sending module 412.

Returning to FIG. 3, at step 304 one or more of the systems described herein may generate a hash based at least in part on a portion of the file stream between a start of the file stream and an offset of the file stream but not based on any part of the file stream following the offset. For example, at step 304 generation module 106 may be programmed to generate hash 204 based at least in part on a portion of file stream 203 between a start of file stream 203 and offset 211 of file stream 203 but not based on any part of file stream 203 following offset 211.

As used herein, the term "hash" may refer to any abbreviated representation of a file and/or contents of a file. For example, the term "hash" may refer to the outputs of one or more hash functions, fingerprints, checksums, and/or any other type of file identifiers that uniquely identify a file and/or file content (barring a collision). For example, the hash may be generated by any of a variety of cryptographic hash functions (including, e.g., MD5 and/or SHA256).

In some examples, the hash may include the position of the offset within the file stream and/or and the total expected size of the file stream. Information about the expected total size of the file stream is normally included in HyperText Transfer Protocol (HTTP), File Transfer Protocol (FTP), and Server Message Block (SMB) file transfers. For example, the hash may include the first 512 kb of the file, and also the string "512 kb," alerting the database to the position of the offset. In some examples, the database may store hashes by the position of the offset, in which case including the position of the offset may allow the database to limit its search for matching hashes to only those with the same position of the offset. In some examples, the database may store hashes by the total expected size of the file stream. In these examples, including the total expected size of the file stream may allow the database to limit its search to hashes with the same total expected size of the file stream. For example, a hash that included the string "size:2 mb" may allow the database to limit its search to hashes of files of expected size 2 mb. Allowing the database to limit its search in this manner may save time and resources.

In some embodiments, generation module 106 may generate the hash before a computing device receiving the file stream (e.g., and on which generation module 106 is operating) has received the entire file stream. As will be described in greater detail below, in some examples one or more of the systems described herein may receive a suggested subsequent offset up to which point within the file stream a hash may be sufficient to distinguish the identity of and/or one or more characteristics of the file stream. In these examples, generation module 106 may generate the hash before the computing system has received data within the file stream at and/or past the subsequent offset. For example, the initial offset may be 256 k, the computer system may only have received data up to 256 k, and the subsequent offset may be 512 k. In another example, the initial offset may be 256 k, the computer system may have received data up to 512 k, and the subsequent offset may be 1 mb.

Figure 5:
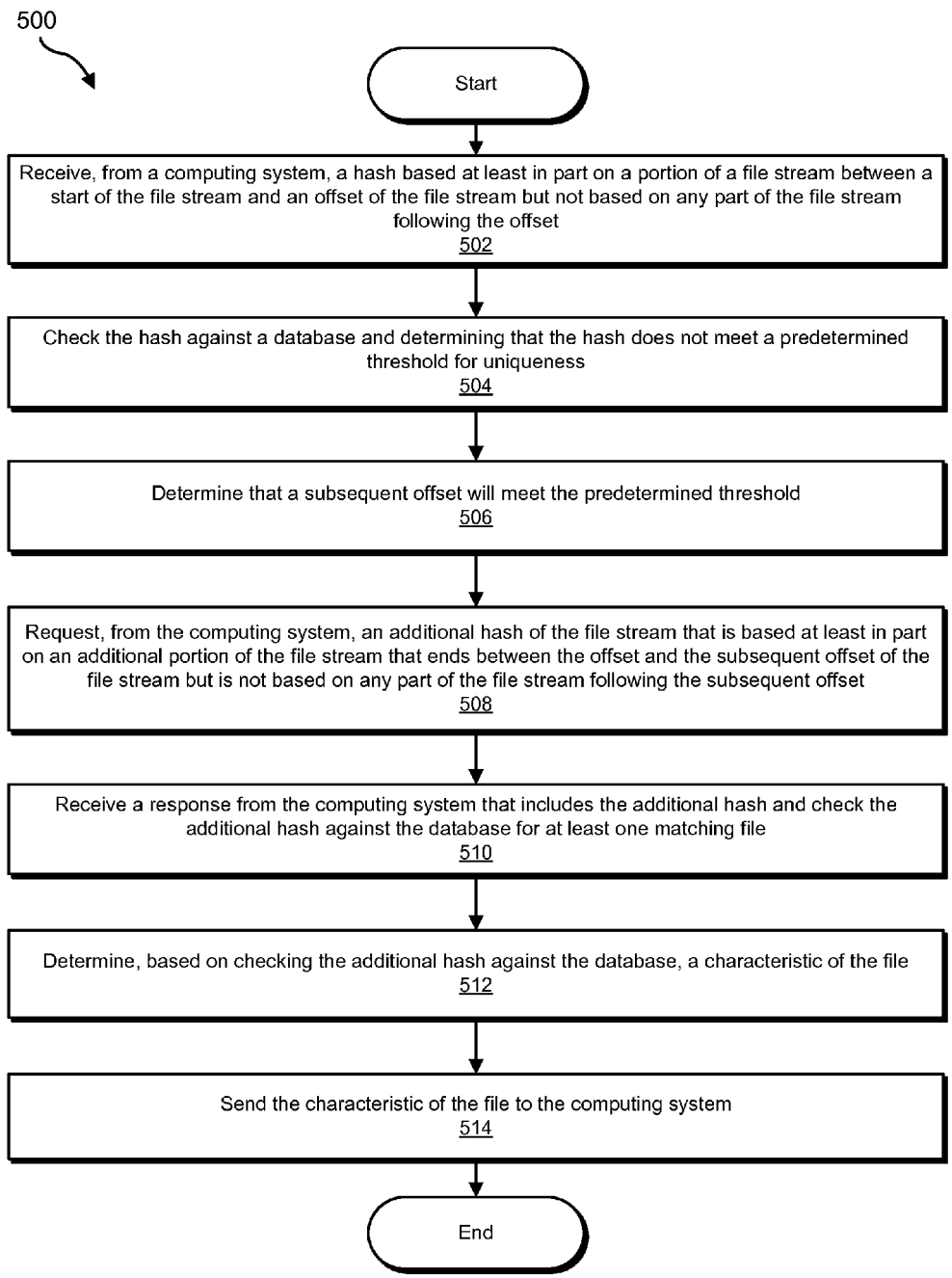
FIG. 5 is a flow diagram of an exemplary method for determining file identities.

FIG. 5 is a flow diagram of an exemplary computer-implemented method 500 for determining file identities. The steps shown in FIG. 5 may be performed by any suitable computer-executable code and/or computing system. In some embodiments, the steps shown in FIG. 5 may be performed by one or more of the components of system 100 in FIG. 1, system 200 in FIG. 2, system 400 in FIG. 4, computing system 710 in FIG. 7, and/or portions of exemplary network architecture 800 in FIG. 8.

As illustrated in FIG. 5, at step 502 one or more of the systems described herein may receive a hash based at least in part on a portion of a file stream between a start of the file stream and an offset of the file stream but not based on any part of the file stream following the offset. For example, at step 502 receiving module 110 may, as part of server 402 in FIG. 4, receive, from computing device 406, hash 204 based at least in part on a portion of file stream 203 between a start of file stream 203 and offset 211 of file stream 203 but not based on any part of file stream 203 following offset 211. In some examples, the computing system may include computing device 406 as shown in FIG. 4.

Returning to FIG. 3, at step 306 one or more of the systems described herein may query the database with the hash to determine whether the hash matches at least one file in the database. For example, at step 306 querying module 108 may, as part of computing device 202 in FIG. 2, query database 120 with hash 204 to determine whether hash 204 matches at least one file in database 120. In some embodiments this may take the form of a structured query language (SQL) query. In some examples the database will contain full file hashes and/or partial file hashes at known offsets. NORTON INSIGHT is an example of a similar type of database.

In some examples, querying the database may take place on server 402, as illustrated in FIG. 4. This database may also determine that the hash does not meet a predetermined threshold for uniqueness, as described in step 504 in FIG. 5. Examples of the predetermined threshold may include a 75% chance of uniqueness, a 90% chance of uniqueness, and/or a 100% chance of uniqueness. In some examples, and as described in step 506 in FIG. 5, the hash may already meet the predetermined threshold at this step, and the method may proceed directly to the determination that the file is malicious. In some examples, the determination module may determine at this step that the hash does not match any files in the database.

As illustrated in FIG. 5, at step 508 one or more of the systems described herein may request, from the computing system, an additional hash of the file stream that is based at least in part on an additional portion of the file stream that ends between the offset and the subsequent offset of the file stream but is not based on any part of the file stream following the subsequent offset. For example, at step 508 request module 410 may, as part of server 402 in FIG. 4, request, from computing device 406, hash 214 of file stream 203 that is based at least in part on an additional portion of file stream 203 that ends between offset 211 and offset 212 of file stream 203 but is not based on any part of file stream 203 following offset 212.

In some embodiments, determining the subsequent offset may include checking the hash against the database and determining that the hash matches a plurality of files in the database, and determining the subsequent offset at which the additional hash will exclude all files within the plurality of files that do not share the characteristic and will match a subset of the plurality of files that do share the characteristic. For example, the hash may match a plurality of files which share the characteristic of belonging to a certain family of malware. In one example, the database may determine that at offset 256$k$ the hash matches a plurality of files which share no defining characteristic, but at offset 512$k$ the hash has excluded all of the files which are not malware. The database may then request a hash at offset 512$k$.

In some embodiments, determining the subsequent offset may include determining the subsequent offset at which the additional hash will exclude all files within the plurality of files except a unique known file within the plurality of files. For example, after the initial query the database may return that there are 100 files that match at the current offset of 512 k, 43 files that may match at an offset of 1 mb, and only one file that matches at an offset of 2 mb. The subsequent offset may, in this example, be 2 m, because that is the offset at which the database may return a unique known file.

Returning to FIG. 3, at step 308 one or more of the systems described herein may receive a receive a response from the database that indicates that the file stream matches a plurality of files in the database and that requests an additional hash of the file stream that is based at least in part on an additional portion of the file stream ending between the offset and a subsequent offset of the file stream but that is not based on any part of the file stream following the subsequent offset. For example, at step 308 receiving module 110 may, as part of computing device 202 in FIG. 2, receive a response from database 120 that indicates that file stream 203 matches a plurality of files in database 120 and that requests hash 214 of file stream 203 that is based at least in part on an additional portion of file stream 203 ending between offset 211 and offset 212 of file stream 203 but that is not based on any part of file stream 203 following offset 212. For example, the response from the server may include a response indicating "matches 7103 files at current offset 1 mb, matches 1 file at offset 4 mb." In this example, the server may thereby request a hash containing the first 4 mb of the file stream. In this example, the initial offset may be 1 mb and the additional offset may be 4 mb.

At step 310 one or more of the systems described herein may generate the additional hash of the file stream based at least in part on the additional portion of the file stream. For example, at step 310 generation module 106 may, as part of computing device 202 in FIG. 2, generate hash 214 of file stream 203 based at least in part on the additional portion of file stream 203. For example, if the initial hash were a SHA256 hash of the first 1 mb of the file and the total expected size of the file, the additional hash may include a SHA256 hash of the first 4 mb of the file and the total expected size of the file.

Generation module 106 may generate the additional hash in any of a variety of ways. In some examples, generation module 106 may use a cumulative and/or homomorphic hash function to generate the additional hash, using the initial hash as input. For example, the additional portion of the file stream may begin from the beginning of the file stream and end at the subsequent offset of the file stream. In this example, generation module 106 may generate the additional hash by adding and/or otherwise combining the initial hash with a hash of a portion of the file stream from the initial offset to the subsequent offset.

At step 312 one or more of the systems described herein may query the database with the additional hash to determine whether the additional hash matches at least one file in the database. For example, at step 312 querying module 108 may, as part of computing device 202 in FIG. 2, query database 120 with hash 214 to determine whether hash 214 matches at least one file in database 120. For example, if the hash is of the first 4 mb of a file with a total expected size of 20 mb, the query may include an instruction to count files where (1) the total expected size is 20 mb, (2) the offset is 4 mb, and (3) the hash of the file matches the additional hash.

Returning to FIG. 5, at step 510 one or more of the systems described herein may receive a response from the computing system that includes the additional hash and check the additional hash against the database for at least one matching file. For example, at step 510 receiving module 110 may, as part of server 402 in FIG. 4, receive a response from computing device 406 that includes hash 214 and check hash 214 against database 120 for at least one matching file.

In some examples, the hash in step 510 may still not meet the predetermined threshold for uniqueness, and the system may continue to iterate over steps 508 and 510 until the hash does meet the predetermined threshold. For example, the server may have returned a response including a string similar to, "75% unique at 2 mb, 99% unique at 4 mb, 100% unique at 16 mb." The gateway may have sent a hash of the first 4 mb of the file, and may have encountered the 1% probability case where the file was not a unique match at 4 mb. In this example the predetermined threshold may be 100%, and so the gateway may send another hash at 16 mb in order to achieve the threshold.

At step 512 one or more of the systems described herein may determine, based on checking the additional hash against the database, a characteristic of the file. For example, at step 512 determination module 408 may, as part of server 402 in FIG. 4, determine, based on checking hash 214 against database 120, characteristic 220 of the file. Some examples of characteristics of the file may include the characteristic of being malicious, and the characteristic of being not malicious, and/or the unique identity of the file. In some examples, the characteristic may include being a sensitive document protected by a data-loss-prevention policy, being an illegitimate file including copyrighted content, being a redundant copy of a file already stored on a client, being encrypted in a specific scheme that needs to be decoded by a particular client, and/or being a high-priority file that merits special treatment. In some examples, the determination module may instead determine that the file stream does not match any file in the database.

At step 514 one or more of the systems described herein may send the characteristic of the file to the computing system. For example, at step 514 sending module 412 may, as part of server 402 in FIG. 4, send characteristic 220 of the file to the computing device 406.

In some examples, sending module 412 may send a message to the computing system indicating whether the file is malicious. For example, sending module 412 may send a determination that the file is a "known good" file, a "known bad" file, and/or an "unknown" file. In some examples the characteristic may include a description of the file, an identifier of the file, a name of the file, a publisher of the file, media information about the file, instructions on the proper processing of the file, and/or an encryption scheme for the file.

Returning to FIG. 3, at step 314 one or more of the systems described herein may receive an additional response from the database including a characterization of the file stream. For example, at step 314 receiving module 110 may, as part of computing device 202 in FIG. 2, receive an additional response from database 120 including a characterization of the file stream.

In some embodiments, one or more of the systems described herein may terminate the file stream in response to a characterization of the file stream as malicious. In some examples, the termination may occur before the file stream has completed. This may save system resources and prevent malicious files from acting on the client.

In some embodiments, the computer system may offload the file stream to a hardware accelerator in response to a characterization of the file stream as not malicious. This may save system resources by prioritizing known good file streams over unknown file streams.

As explained above in connection with method 300 in FIG. 3, a file stream may be passing through a gateway on the way to a client system. The client system may need to be protected from malware, so the gateway may attempt to make a determination of whether the file stream contains malware.

The gateway may generate a partial hash of the file stream based on an offset of the file and send the hash to a server. The server may query a database to determine if the hash matches any known files. If the hash matches a plurality of files, the database may determine an additional hash with which the query will return only one file. This additional hash may be based upon a subsequent offset of the file stream.

Once the gateway has observed the subsequent offset of the file stream it may send the additional hash and may receive a response from the server indicating a characterization of the file. If the file is characterized as malware the gateway can terminate the file stream before completion, protecting the client system from the malware while saving the resources that would have otherwise been used to continue to process the file stream until completion.

Figure 6:
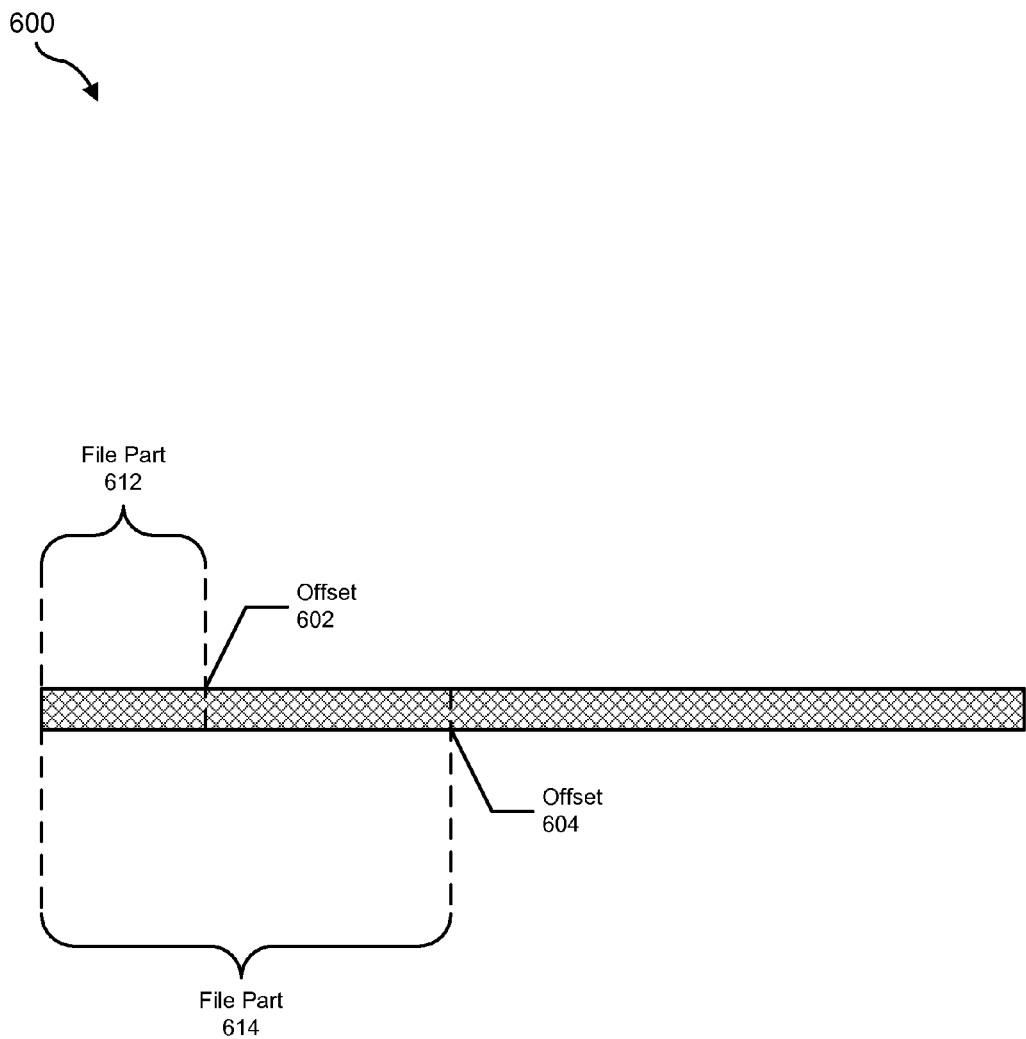
FIG. 6 is a diagram of an exemplary file stream.

FIG. 6 is an illustration of exemplary file stream 600. As shown in FIG. 6, file part 612 may include the part of the file starting from the start of the file and ending at offset 602. For example, file part 612 may represent the first 64 k of the file. In some examples, hash 204 in FIG. 2 may be generated from a file part similar to file part 612. File part 614 may represent the part of the file starting from the start of the file and ending at offset 604. For example, file part 614 may represent the first 128 k of the file. In some examples, hash 214 in FIG. 2 may be generated from file part 614. Examples of offsets that offset 602 and offset 604 may represent may include 64 k, 128 k, 256 k, 512 k, 1 mb, 2 mb, 4 mb, 8 mb, 16 mb, 32 mb, 64 mb, 128 mb, and so forth.

Figure 7:
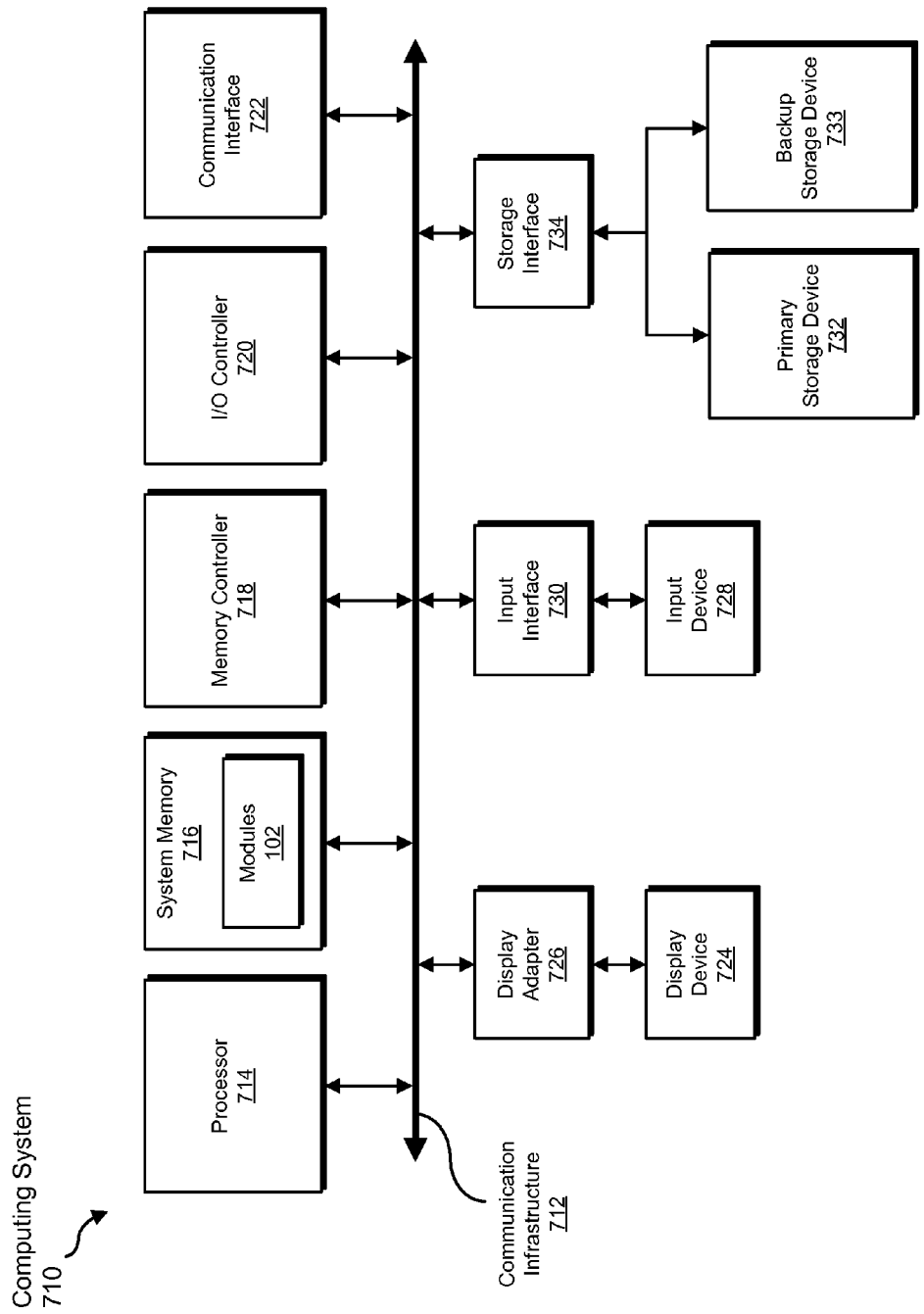
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the identifying, generating, querying, and/or receiving steps described herein. All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computing system Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 710. All or a portion of the computer program stored on the computer-readable-storage medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
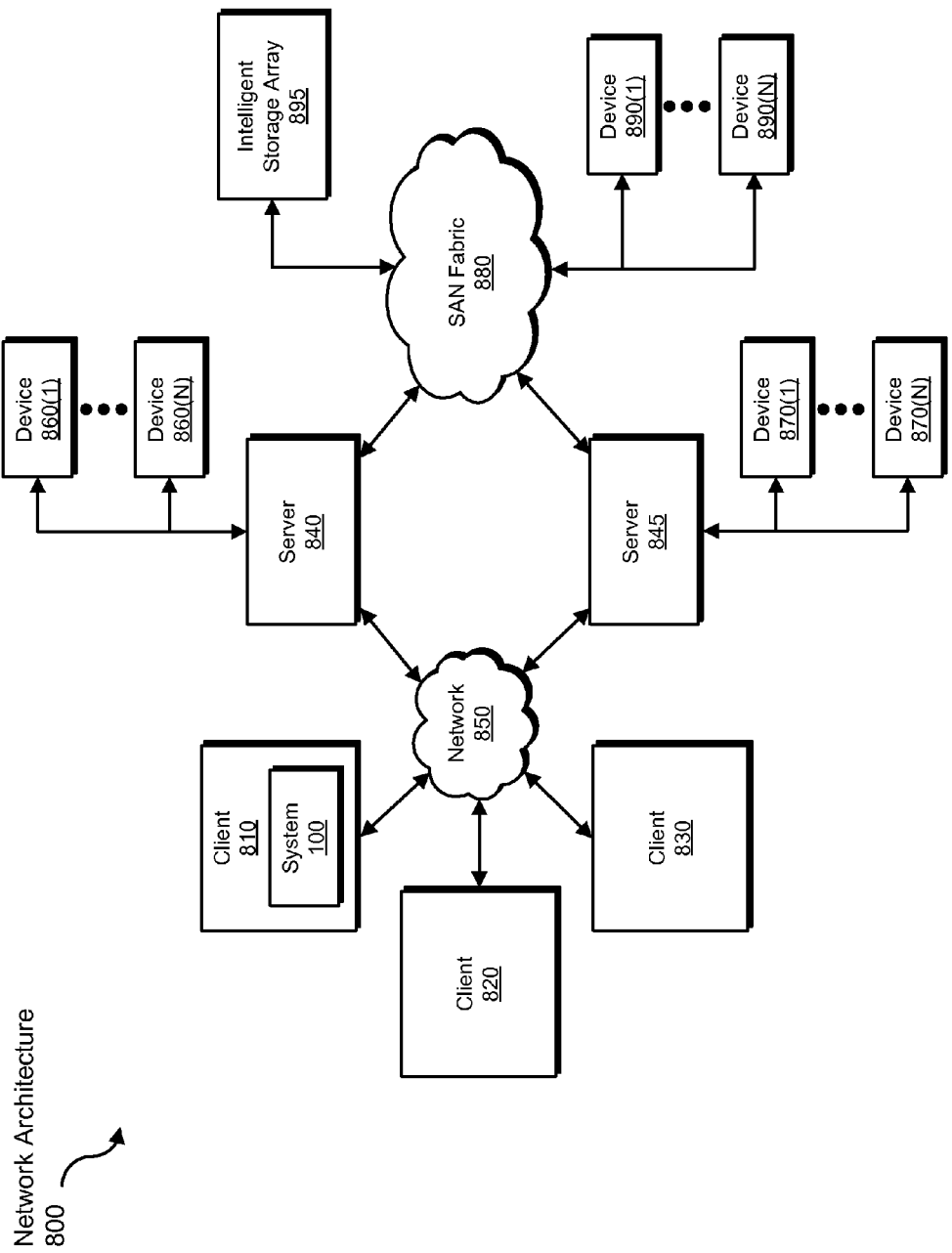
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the identifying, generating, querying, and/or receiving steps disclosed herein. All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890 (1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for determining file identities.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an unidentified file stream to be transformed, transform the unidentified file stream, output a result of the transformation to a client system, use the result of the transformation to identify the file stream, and store the result of the transformation to the client system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for determining file identities at least a portion of the method being performed by a computing device comprising at least one processor, the method comprising:
    identifying a file stream that is subject to a determination of whether the file stream matches at least one file in a database;
    generating a first hash based at least in part on a portion of the file stream between a start of the file stream and an offset of the file stream but not based on any part of the file stream following the offset;
    querying the database with the first hash to determine whether the first hash matches at least one file in the database;
    receiving a response from the database that indicates that the file stream matches a plurality of files in the database and that requests, by specifying a subsequent offset of the file stream, an additional hash of the file stream that is based at least in part on an additional portion of the file stream ending between the offset and the subsequent offset of the file stream but that is not based on any part of the file stream following the subsequent offset;
    generating the additional hash of the file stream based at least in part on the additional portion of the file stream;
    querying the database with the additional hash to determine whether the additional hash matches at least one file in the database;
    receiving an additional response from the database comprising a characterization of the file stream;
    determining, based on the characterization, a unique identity of a file within the file stream.

2. The computer-implemented method of claim 1:
    wherein the characterization of the file stream comprises an indication that the file stream is malicious;
    further comprising terminating the file stream in response to the indication that the file stream is malicious.

3. The computer-implemented method of claim 1:
    wherein the characterization of the file stream comprises an indication that the file stream is not malicious;
    further comprising offloading the file stream to a hardware accelerator in response to the indication that the file stream is not malicious.

4. The computer-implemented method of claim 1, further comprising:
    identifying a second file stream that is subject to a second determination of whether the second file stream matches at least one file in the database;
    generating a second hash based at least in part on a second portion of the second file stream between a second start of the second file stream and a second offset of the second file stream but not based on any part of the second file stream following the second offset;
    querying the database with the second hash to determine whether the second hash matches at least one file in the database;
    receiving a second response from the database indicating that the second hash does not match any file in the database.

5. The computer-implemented method of claim 1, wherein generating the first hash is further based on at least one of:
    a position of the portion in the file stream;
    a total expected size of the file stream.

6. The computer-implemented method of claim 1, further comprising terminating the file stream before the file stream is complete and in response to receiving the additional response.

7. The computer-implemented method of claim 1, wherein generating the first hash comprises generating the first hash before receiving data at the subsequent offset within the file stream.

8. A computer-implemented method for determining file identities, at least a portion of the method being performed by a computing device comprising at least one processor, the method comprising:

receiving, from a computing system, a first hash based at least in part on a portion of a file stream between a start of the file stream and an offset of the file stream but not based on any part of the file stream following the offset;

checking the first hash against a database and determining that the first hash does not meet a predetermined threshold for uniqueness;

determining that a subsequent offset will meet the predetermined threshold;

requesting, from the computing system, by specifying the subsequent offset, an additional hash of the file stream that is based at least in part on an additional portion of the file stream that ends between the offset and the subsequent offset of the file stream but is not based on any part of the file stream following the subsequent offset;

receiving a response from the computing system that comprises the additional hash and checking the additional hash against the database for at least one matching file;

determining, based on checking the additional hash against the database, a characteristic of the file;

determining, based on the characteristic, a unique identity of the file;

sending the characteristic of the file to the computing system.

9. The computer-implemented method of claim 8, wherein determining that the subsequent offset will meet the predetermined threshold comprises:

checking the first hash against the database and determining that the first hash matches a plurality of files in the database;

determining the subsequent offset at which the additional hash will exclude all files within the plurality of files except a unique known file within the plurality of files.

10. The computer-implemented method of claim 8, wherein determining that the subsequent offset will meet the predetermined threshold comprises:

checking the first hash against the database and determining that the first hash matches a plurality of files in the database;

determining the subsequent offset at which the additional hash will exclude all files within the plurality that do not share the characteristic and will match a subset of the plurality of files that do share the characteristic.

11. The computer-implemented method of claim 8, further comprising:

receiving, from the computing system, a second hash that is based at least in part on a second portion of a second file stream between a start of the second file stream and a second offset of the second file stream but that is not based on any part of the second file stream following the second offset;

checking the second hash against the database and determining that the second hash does not match any files in the database;

sending a second response to the computing system indicating that the second file is unrecognized.

12. The computer-implemented method of claim 8, wherein:

the computing system comprises a gateway configured to filter network traffic for a client system;

the file stream is traveling to the client system via the gateway.

13. The computer-implemented method of claim 8, further comprising:

receiving a prior hash from the computing system based at least in part on the file stream;

checking the prior hash against the database and determining that the prior hash does not meet the predetermined threshold for uniqueness;

determining that the offset will meet the predetermined threshold;

requesting, from the computing system, the first hash of the file stream that is based at least in part on the portion of the file stream between the start of the file stream and the offset of the file stream but not based on any part of the file stream following the offset.

14. A system for determining file identities:

the system comprising:

an identification module programmed to identify a file stream that is subject to a determination of whether the file stream matches at least one file in a database;

a generation module programmed to generate a first hash based at least in part on a portion of the file stream between a start of the file stream and an offset of the file stream but not based on any part of the file stream following the offset;

a querying module programmed to query the database with the first hash to determine whether the first hash matches at least one file in the database;

a receiving module programmed to receive a response from the database that indicates that the file stream matches a plurality of files in the database and that requests, by specifying a subsequent offset of the file stream, an additional hash of the file stream that is based at least in part on an additional portion of the file stream ending between the offset and the subsequent offset of the file stream but that is not based on any part of the file stream following the subsequent offset;

at least one hardware processor configured to execute the identification module, the generation module, the querying module, and the receiving module;

wherein:

the generation module is further programmed to generate the additional hash of the file stream based at least in part on the additional portion of the file stream;

the querying module is further programmed to query the database with the additional hash to determine whether the additional hash matches at least one file in the database;

the receiving module is further programmed to receive an additional response from the database comprising a characterization of the file stream and determine, based on the characterization, a unique identity of a file within the file stream.

15. The system of claim 14:

wherein the characterization of the file stream comprises an indication that the file stream is malicious;

further comprising a termination module programmed to terminate the file stream in response to the indication that the file stream is malicious.

16. The system of claim 14:

wherein the characterization of the file stream comprises an indication that the file stream is not malicious;

further comprising an offloading module programmed to offload the file stream to a hardware accelerator in response to the indication that the file stream is not malicious.

17. The system of claim 14, wherein:
the identification module is further programmed to identify a second file stream that is subject to a second determination of whether the second file stream matches at least one file in the database;
the generation module is further programmed to generate a second hash based at least in part on a second portion of the second file stream between a second start of the second file stream and a second offset of the second file stream but not based on any part of the second file stream following the second offset;
the querying module is further programmed to query the database with the second hash to determine whether the second hash matches at least one file in the database;
the receiving module is further programmed to receive a second response from the database indicating that the second hash does not match any file in the database.

18. The system of claim 14, wherein the generation module is further programmed to generate the first hash by generating the first hash before receiving data at the subsequent offset within the file stream.

19. The system of claim 14, wherein the generation module is programmed to generate the first hash further based on at least one of:
a position of the portion in the file stream;
a total expected size of the file stream.

20. The system of claim 14, wherein the receiving module is further programmed to terminate the file stream before the file stream is complete and in response to receiving the additional response.

* * * * *